United States Patent
Chang et al.

(10) Patent No.: US 6,577,576 B2
(45) Date of Patent: Jun. 10, 2003

(54) OPTICAL STORAGE CARRIER PLAYER WITH AN OBSERVING WINDOW

(75) Inventors: Yen-Jen Chang, KaoShiung (TW); Chun-Ting Chen, TaiNan (TW)

(73) Assignee: Benq Corporation, Taoyuan (TW)

( * ) Notice: Subject to any disclaimer, the term of this patent is extended or adjusted under 35 U.S.C. 154(b) by 139 days.

(21) Appl. No.: 09/915,310

(22) Filed: Jul. 27, 2001

(65) Prior Publication Data

US 2002/0136138 A1 Sep. 26, 2002

(30) Foreign Application Priority Data

Mar. 22, 2001 (TW) ...................................... 90204322 U

(51) Int. Cl.$^7$ .............................................. G11B 33/02
(52) U.S. Cl. ..................... 369/75.1; 369/77.1; 369/77.2
(58) Field of Search ............................... 369/75.1, 77.1, 369/77.2; 360/78, 137, 292

(56) References Cited

U.S. PATENT DOCUMENTS

| | | | | |
|---|---|---|---|---|
| D352,712 S | * | 11/1994 | Wada | D14/156 |
| D422,280 S | * | 4/2000 | Zeitman | D14/156 |
| 6,222,809 B1 | * | 4/2001 | Totsuka et al. | 369/75.1 |
| 6,285,867 B1 | * | 9/2001 | Boling et al. | 455/404 |

* cited by examiner

*Primary Examiner*—William Korzuch
*Assistant Examiner*—Mark Blouin
(74) *Attorney, Agent, or Firm*—Troxell Law Office PLLC

(57) ABSTRACT

A optical storage carrier player, comprising: at least a light source, a connection arm, a focusing rib and a window. The connection arm can provide a passage for a light from the light source. The focusing rib that is protruding out the connection arm and structured in a ring shape for focusing the light. The window is arranged on an top cover of the player and connected with the connection arm to allow an operator to observe the interior of the player directly through the window.

11 Claims, 6 Drawing Sheets

OPTICAL STORAGE CARRIER PLAYER WITH AN OBSERVING WINDOW

BACKGROUND OF THE INVENTION

1. Field of the Invention

The present invention relates to an observing window, especially to a kind of window that is disposed at the top cover of an optical storage carrier player and uses the application of light focusing of a convex lib to achieve the direct observation of an interior chamber of the optical storage carrier player.

2. Background of the Invention

The times is changing with the fast progressing technology. The relevant techniques of electronics are improved daily. The functions of electronics products are also enhanced abruptly. The practical application of the relative technology of optical storage carrier player is more prevalent. In the mean time, the use and contact of the optical storage carrier player are further frequently, so the safety measures are further indispensable.

Please refer to FIG. 1, which shows the three-dimensional structure illustration for the prior optical storage carrier player. The prior optical storage carrier player arranges with a base 10, which is arranged with a motor 20. When the main axis of the motor is spinning, it can drive a CD (compact disk) 30 to make a rotation motion. Matching with a data storing and reading apparatus, it can accomplish the storing and reading procedures of a large amount of relevant sound and image data, so the optical storage carrier player becomes one of the necessary peripherals for computer.

Since the optical storage carrier player is a machine equipment with high precision, in order to avoid the dust and ash influencing the precision of the machine and the CD with high rotation speed generating accidence to the operation personnel, so the prior optical storage carrier player further arranges with an top cover 40. The top cover 40 has the effects that can protect the CD 30 and interior parts of the optical storage carrier player from the dust and ash to influence its precision and protect the safety of operation personnel and surrounding objects. The top cover 40 can further be designed as having different curvatures with the effect of beauty.

Please refer to FIG. 2, which shows the closing down illustration for the prior optical storage carrier player. When the prior optical storage carrier player is at closing down state, i.e. the top cover 40 and the base seat 10 are connected together, from the outside of the shell 40, the personnel can not to tell whether the CD 30 is spinning or not or if it is an appropriate and safe time to take out the CD 30. Nowadays, especially for a optical storage carrier player forges toward high-speed era, it may further jeopardize the operator. Even in a dimmer-light factory or room, it is further impossible to detect the interior information of the optical storage carrier player. From above description, we know that the prior optical storage carrier player indeed can not provide a very perfect protection and the improvement of the safety of the prior optical storage carrier player to surely protect the security of the consumers and users is really urgent.

SUMMARY OF INVENTION

The main object of the present invention is to provide an optical storage carrier player, which can allow the user clearly observe the interior chamber of the player under dim light situation; so the user can avoid opening the top cover when the optical storage carrier (CD) is still rotating in high speed.

Another object of the present invention is to provide an optical storage carrier player, which can reach the effect of beautiful appearance of the optical storage carrier player.

To reach above-mentioned objects, a optical storage carrier player of the present invention comprising: (a) a bottom seat, (b) a top cover movably connected with the bottom seat, the top cover having an top opening, the top cover selectively maintained in one of an opened position and a closed position relative to the bottom seat, (c) a light source disposed on the bottom seat for generating a light, (d) a light guide disposed on the top cover, the light guide comprising a connection arm and an observing window, the observing window disposed within the top opening, and (e) a receiving leg formed on the outer end of the connection arm, the cross section of the receiving leg is larger than that of the connection arm. When the top cover is in the closed position, the connection arm is adjacent to the light source, such that the light guide effectively transmit the light from the light source toward the observing window. Besides, the ring-shaped focusing rib is formed on the bottom surface of the light guide; by focusing the light received by the receiving leg, the focusing rib generates a ring-shaped brighter portion around the observing window.

For your esteemed review committee members to further understand and recognize the present invention, a detailed description matching with several drawings are present as following:

DETAILED DESCRIPTION OF A PREFERRED EMBODIMENT

Figure 1:
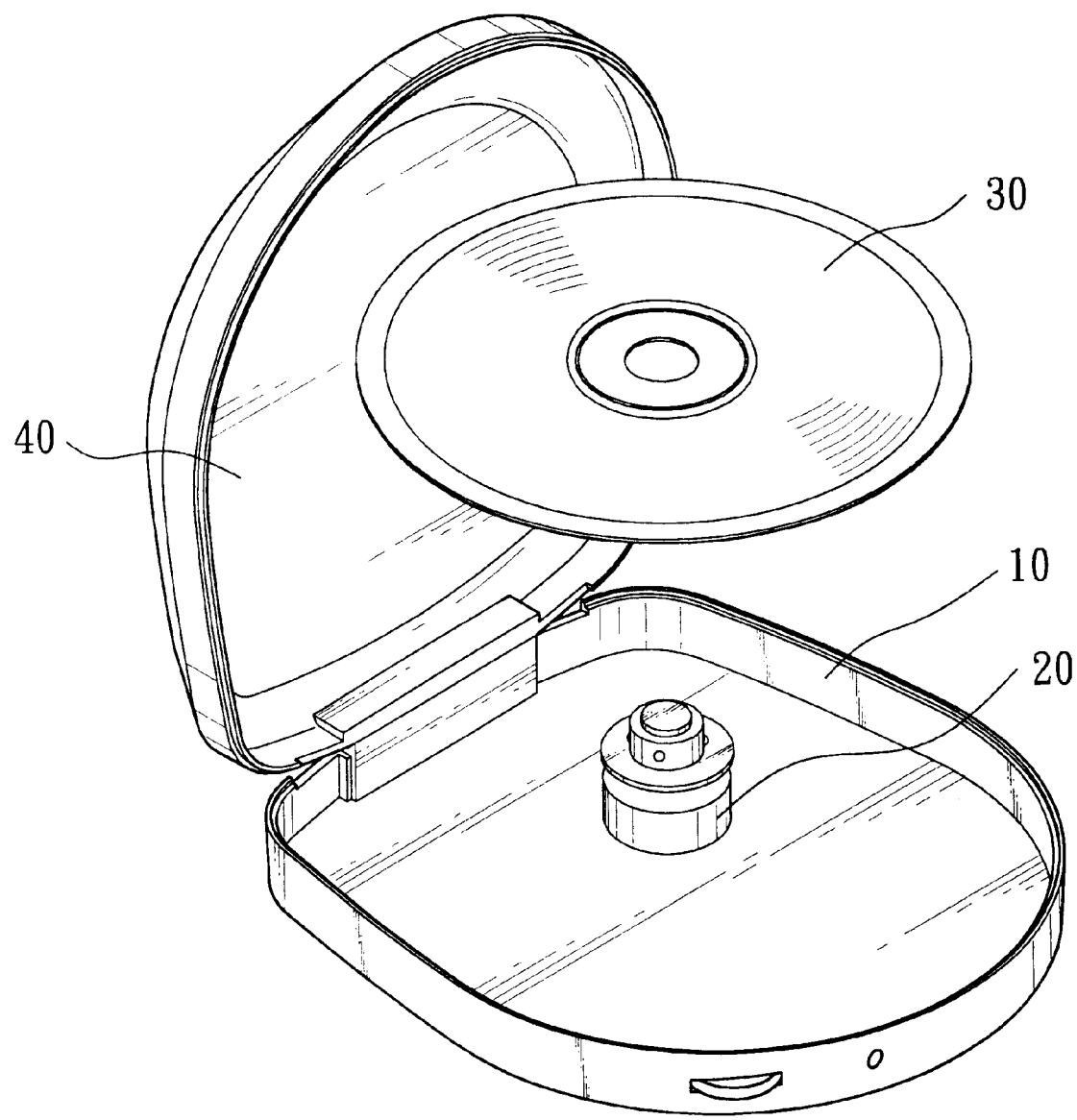
FIG. 1 is a three-dimensional structure illustration for a prior optical storage carrier player.
Figure 2:
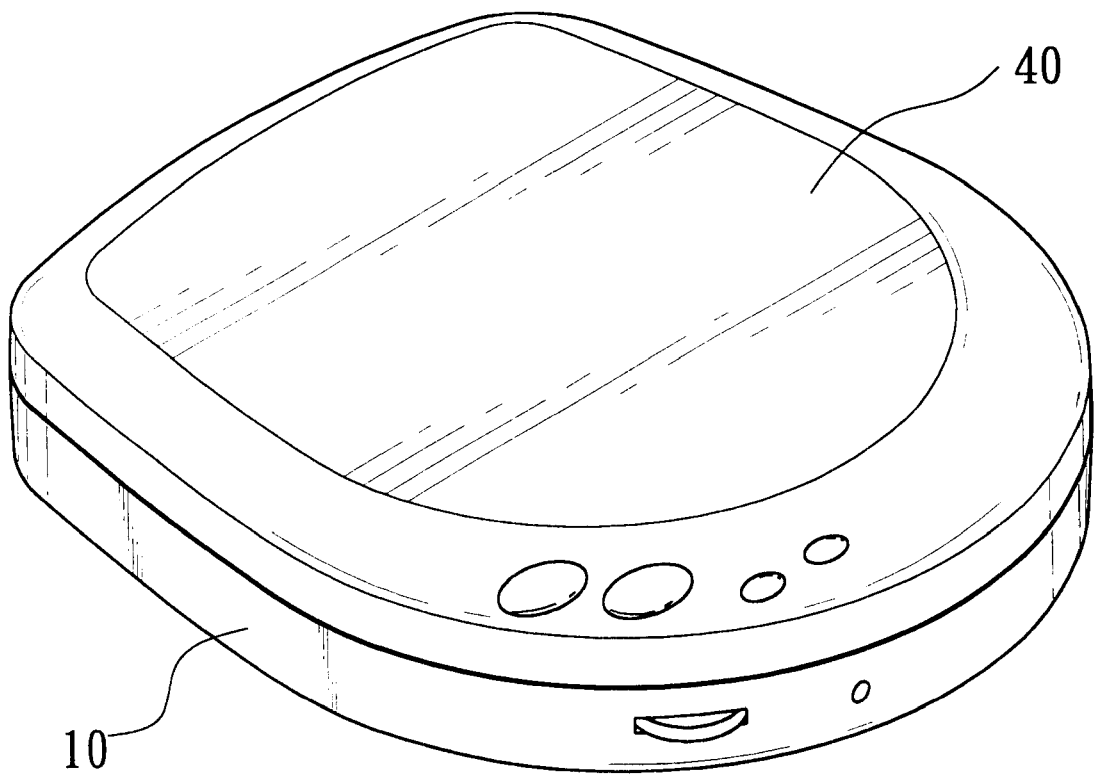
FIG. 2 is a closing down illustration for a prior optical storage carrier player.
Figure 3A:
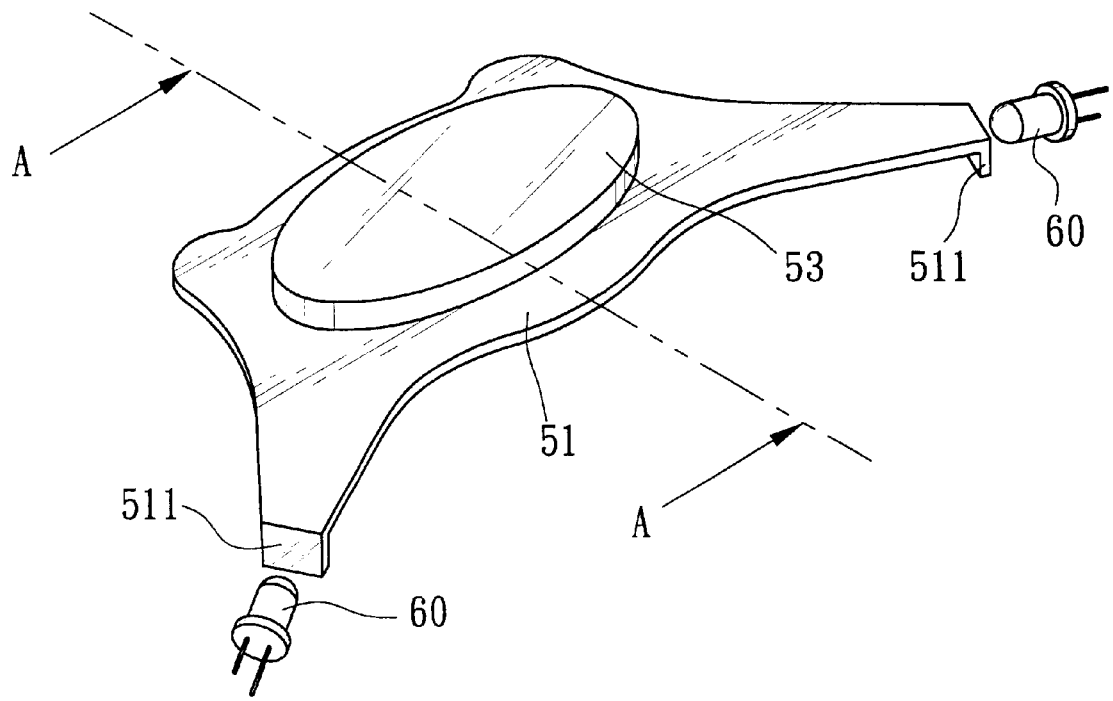
FIG. 3(A) is a three-dimensional structure illustration for a preferable embodiment of a light guide of the present invention.
Figure 3B:
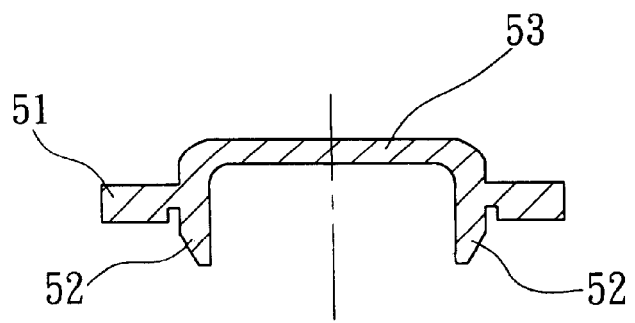
FIG. 3(B) is an A—A section-view illustration for a preferable embodiment of the light guide in FIG. 3(A).

Please refer to FIG. 3(A) and FIG. 3(B), which are the illustrations for the preferable embodiment structure of the light guide 50 and the light source 60 of the present invention.

The light guide 50 of the present invention includes a connection arm 51, a focusing rib 52, and an observing window 53. Since the light guide 50 in the preferable embodiment of the present invention is designed as a three-dimensional structure in left-and-right symmetry, so the preferable number of the light source 60 is two. Of course, due to different shape design of the light guide 50 of an optical storage carrier player, a different number of the light source 60 can be allocated. Such kind variations are obvious to those general skilled person in this technology field, so the extra description is not presented here.

The connection arm 51 is made of a light-transmitting material, which further comprises at least a receiving leg 511. The receiving leg 511 is provided on the outer end of the connection arm 51 and extended perpendicular to the connection arm 51. The vertical cross section of the receiving leg 511 is larger than the vertical cross section of the connection arm 51, so the receiving leg 511 can receive more light from the light source 60. Since the connection arm 51 is a symmetrical structure, so the number of the receiving legs 511 is two. The receiving leg 511 can directly receive the light from the light source 60, with the connection arm 51 made of a light-transmitting material, provide a passage for the light from the light source 60 toward the observing window 53.

The focusing rib 52, protruding out the connection arm 51 and formed on the bottom surface of the light guide 50 around the observing window 53, and the focusing rib 52 is shaped as a ring shape structure. By focusing the light received by the receiving leg 511, the focusing rib 52 generates a ring-shaped brighter portion around the observing window 53.

The observing window 53 is integrally formed with the connection arm 51, and since it is made of a transparent material, so it can provide the user a direct observation of the interior chamber of the player chamber through the observing window 53.

Figure 4A:
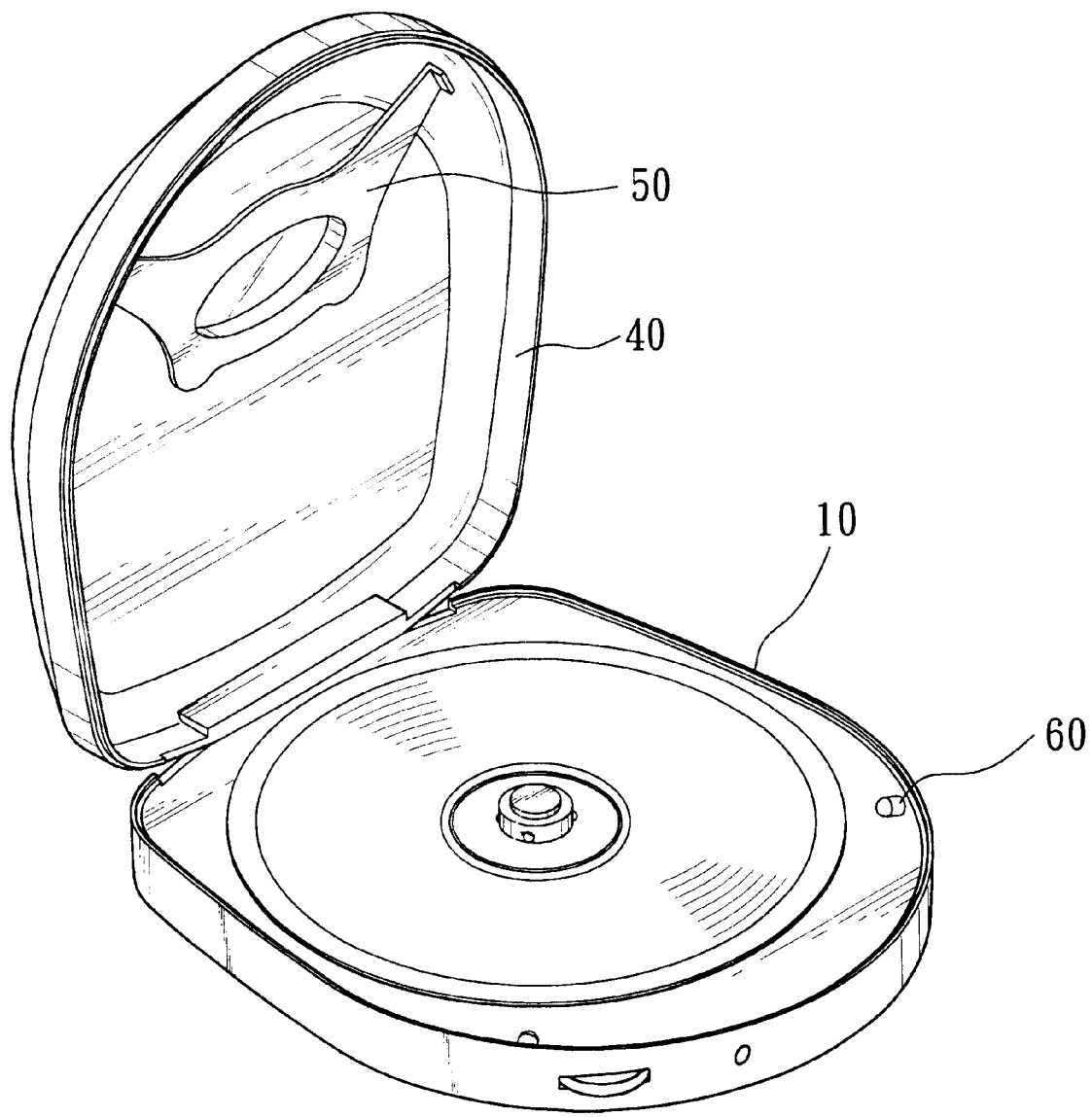
FIG. 4(A) is a three-dimensional structure illustration for a preferable embodiment of the connection between the light guide and optical storage carrier player of the present invention.
Figure 4B:
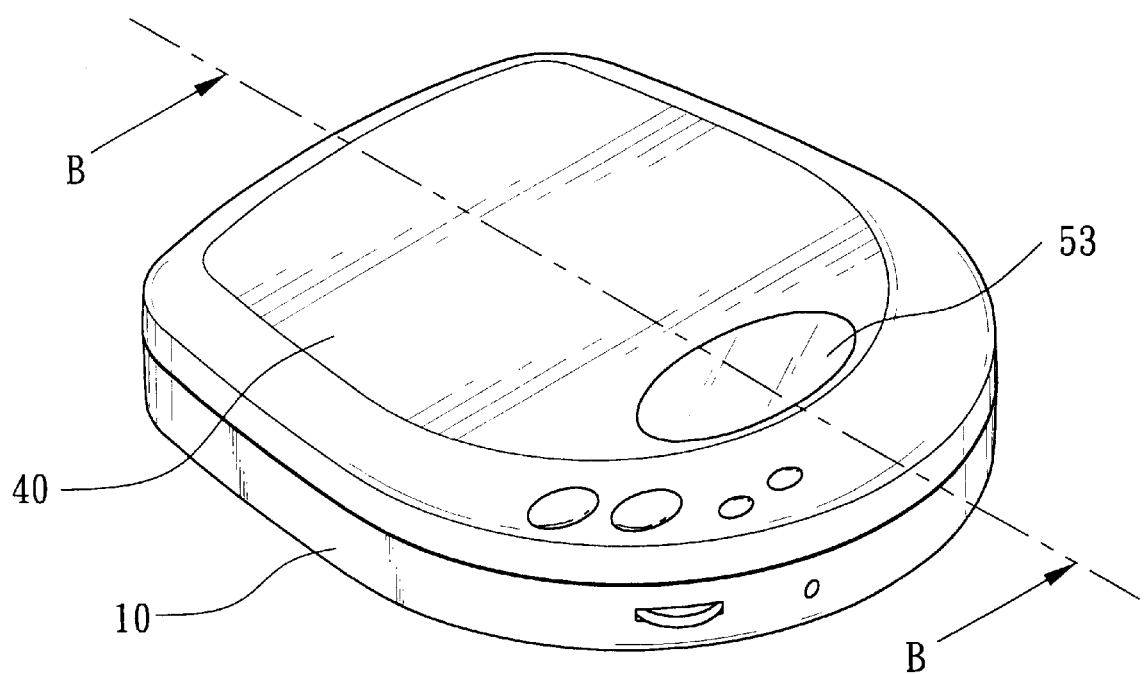
FIG. 4(B) is a closing down illustration for a preferable embodiment of the connection between the light guide and optical storage carrier player of the present invention.
Figure 4C:
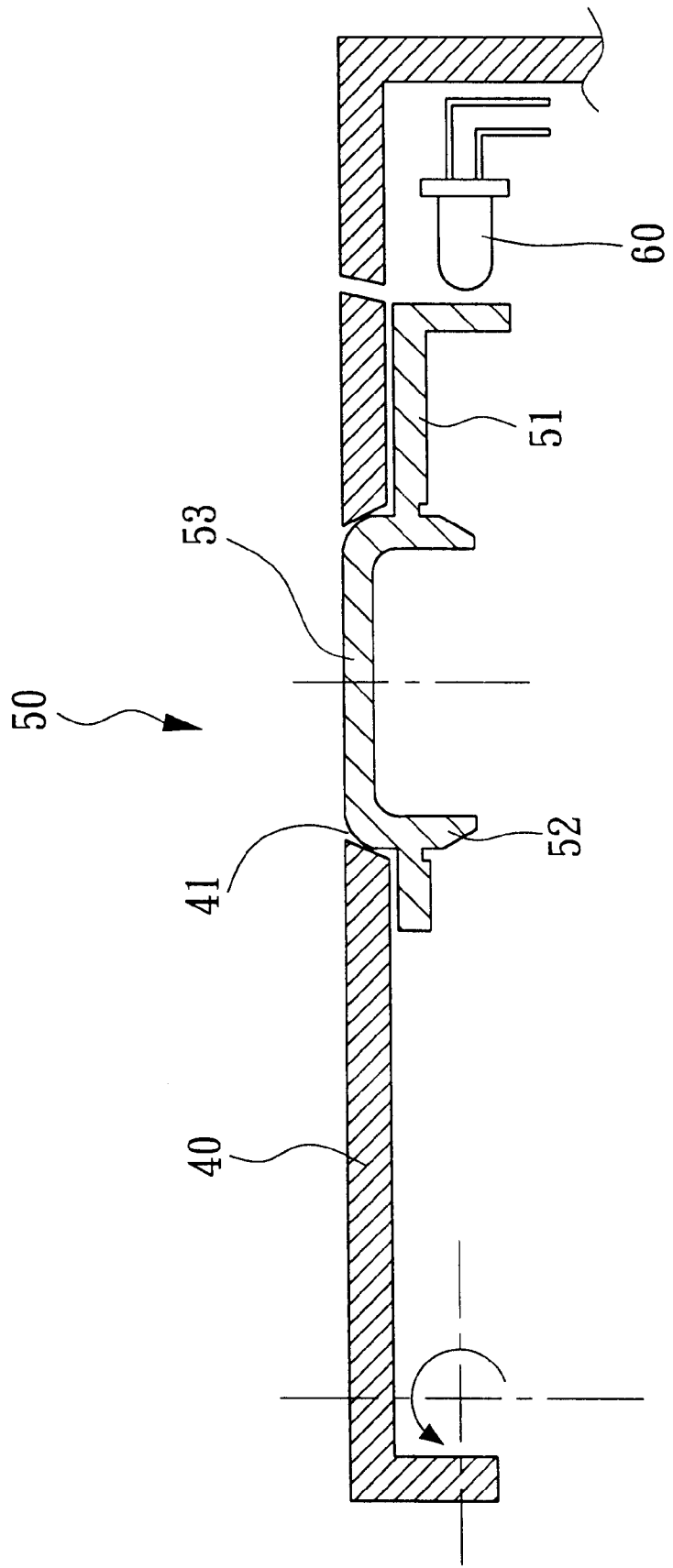
FIG. 4(C) is a B—B sectional view illustration for a preferable embodiment of the connection between the light guide and optical storage carrier player in FIG. 4(B).

Please refer to FIG. 4(A) through FIG. 4(C), which are the illustrations of the preferable embodiments of the connection between the light guide 50 and the player of the present invention. Wherein, the player comprises a base seat 10 and an top cover 40, which can be separated from each other to be maintained in a opened position (as shown in FIG. 4(A)), and can also be connected together to be maintained in a closed position (as shown in FIG. 4(B)). The light source 60 is a LED, which is provided at a proper position of the base seat 10. The top opening 41 is formed on the top cover 40. The shape of the observing window 53 fits the top opening 41, so when the light guide 50 is attached onto the top cover 40, the observing window 53 can be properly disposed into the top opening 41.

When the top cover 40 is in the closed position, the receiving leg 511 is adjacent to the light source 60, such that the connection arm 51 can effectively transmit substantial portion of the light from the light source 60 toward the observing window 53. With the transmitted light, the observing window 53 can allow the user directly observe the interior chamber of the player through the observing window 53.

As to a factory or room with dim light, through focusing the light of the light source 60 to form a ring-shaped brighter portion around the observing window 53, it can further assist the use to observe the interior chamber of the player from the outside.

From the description of the optical storage carrier player of the present invention, it can surely provide the user to observe the operation situation of the interior of a player when in shortage of light source, and securely protect the safety of the user. The present invention can indeed overcome the shortcoming of the prior art and satisfies the needs of the production industries to promote their production competition.

What is claimed is:

1. An optical storage carrier player, comprising:

a light source for generating a light;

a connection arm, which can provide a passage for the light;

a focusing rib, protruding out the connection arm and structured in a ring shape for focusing the light; and a window, arranged on an top cover of the player and connected with the connection arm to allow an operator to observe the interior of the player directly through the window.

2. The light guide of claim 1, wherein the light source is provided at a proper position of a base seat of the player.

3. The light guide of claim 1, wherein the top cover provides a top opening such that the shape of the window fits the top opening.

4. The light guide of claim 1, wherein the light source is a LED.

5. The light guide of claim 1, wherein the window is a transparent material.

6. The light guide of claim 1, wherein the connection arm is made of a light-transmitting material.

7. The light guide of claim 1, wherein the connection arm further comprises at least a receiving leg, being provided on one end of the connection arm and being perpendicular to the connection arm for receiving the light from the light source.

8. An optical storage carrier player comprising:

a bottom seat;

a top cover movably connected with the bottom seat, the top cover having an top opening, the top cover selectively maintained in one of an opened position and a closed position relative to the bottom seat;

a light source disposed on the bottom seat for generating a light; and a light guide disposed on the top cover, the light guide comprising a connection arm and an observing window, the observing window disposed within the top opening;

wherein when the top cover being in the closed position, the connection arm being adjacent to the light source, such that the light guide transmitting the light from the light source toward the observing window.

9. The optical storage carrier player of claim 8, wherein the light guide further comprising a focusing rib formed on the bottom surface of the light guide, and the focusing rib is shaped as a ring for focusing the light.

10. The optical storage carrier player of claim 8, wherein the light source is a LED.

11. The optical storage carrier player of claim 8, wherein the connection arm further comprises a receiving leg formed on an outer end of the connection arm, the cross section of the receiving leg is larger than that of the connection arm for receiving more light from the light source.

* * * * *